United States Patent
Adam

(10) Patent No.: US 6,485,559 B2
(45) Date of Patent: Nov. 26, 2002

(54) PIGMENT COLORANTS FOR THE MASS-COLORING OF SYNTHETIC MATERIALS

(75) Inventor: Jean-Marie Adam, Rosenau (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/749,014

(22) Filed: Dec. 27, 2000

(65) Prior Publication Data

US 2001/0020432 A1 Sep. 13, 2001

(30) Foreign Application Priority Data

Dec. 29, 1999 (EP) .............................. 99811217

(51) Int. Cl.⁷ .............................. C09B 1/32; C09B 1/58; C08K 5/18; C08K 5/36
(52) U.S. Cl. ..................... 106/493; 106/498; 552/238
(58) Field of Search ................. 106/493, 498; 552/238

(56) References Cited

U.S. PATENT DOCUMENTS

| | | | |
|---|---|---|---|
| 2,226,909 A | 1/1940 | Peter ........................... | 260/374 |
| 2,852,535 A | 9/1958 | Peter et al. .................. | 260/374 |
| 3,409,385 A | 11/1968 | Dehn, Jr. et al. ............... | 8/39 |
| 3,770,640 A | 11/1973 | Bartlett ........................ | 252/68 |
| 3,928,396 A | 12/1975 | Kishi et al. .................. | 260/380 |
| 4,124,355 A | 11/1978 | Greenhalgh et al. ............ | 8/2.5 |
| 4,128,396 A | 12/1978 | Wick et al. ....................... | 8/39 |

FOREIGN PATENT DOCUMENTS

| | | |
|---|---|---|
| GB | 1372668 | 11/1974 |
| GB | 2014178 | 8/1979 |

OTHER PUBLICATIONS

Chem. Abstr. vol. 80, No. 4, 15786m (1974) for JP 7368638 (Dec. 1971).
Patent Abstracts of Japan Publication No. 63135454 (Jun. 1988).
Derwent Abstr. 1983–707828 [28] for JP 58093050 (Jun. 1983).
Chem. Abst. vol. 58, No. 4, (1963), 3368d for Yuki Gosei Kagaku Kyokai Shi 20, 584–90, (1962) ( No month).
Patent Abstracts of Japan Publication No. 06065510, (Mar. 1994).

Primary Examiner—Anthony J. Green

(74) Attorney, Agent, or Firm—Kevin T. Mansfield

(57) ABSTRACT

The present Application relates to pigment colourants of formula (1)

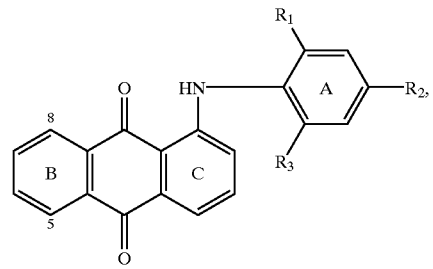

wherein $R_1$ is $C_1$–$C_6$alkyl, $C_1$–$C_6$alkoxy, phenoxy or halogen, $R_2$ is hydrogen, $C_1$–$C_6$alkyl, $C_1$–$C_6$alkoxy, phenoxy, halogen, acylamino, —$CH_2$NHacyl or the radical

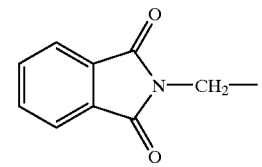

and $R_3$ is $C_1$–$C_6$alkyl, $C_1$–$C_6$alkoxy, phenoxy or halogen, the ring A may be further substituted by —$SO_3^-M^+$, wherein $M^+$ is a cation, and the rings B and C may be unsubstituted or further mono- or poly-substituted by halogen, hydroxy, —SH, amino, $C_1$–$C_6$alkylamino, $C_1$–$C_6$alkyl, $C_1$–$C_6$alkoxy, phenoxy, acylamino, $C_1$–$C_6$thioalkyl or by thiophenyl, and the ring B may be substituted in the 5- or 8-position by a radical of formula (2)

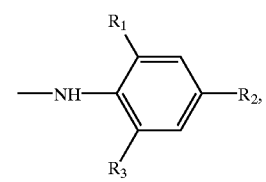

wherein $R_1$, $R_2$ and $R_3$ are as defined above, to a process for their preparation, and to their use in the mass-coloring of synthetic materials.

12 Claims, No Drawings

PIGMENT COLORANTS FOR THE MASS-COLORING OF SYNTHETIC MATERIALS

The present invention relates to novel pigment colourants, to their preparation and to their use in the mass-colouring of synthetic materials.

Pigment colourants and their use in the mass-colouring of synthetic materials are known. It has been found, however, that such colourants do not always fully meet the highest demands, especially in respect of fastness to light, thermostability and/or colour strength. Accordingly, there is a need for new pigment colourants which yield coloured materials that are fast to light, thermostable and of good tinctorial strength, and which exhibit good all-round properties.

Surprisingly, it has now been found that the pigment colourants according to the invention meet the above-mentioned criteria to a considerable degree.

Accordingly, the present invention relates to pigment colourants of formula

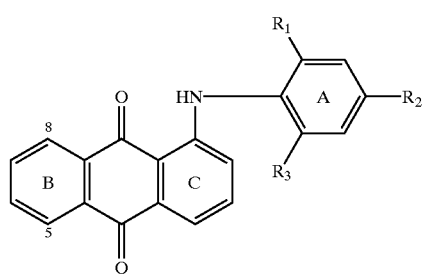

(1)

wherein
$R_1$ is $C_1$–$C_6$alkyl, $C_1$–$C_6$alkoxy, phenoxy or halogen,
$R_2$ is hydrogen, $C_1$–$C_6$alkyl, $C_1$–$C_6$alkoxy, phenoxy, halogen, acylamino, —$CH_2NH$acyl or the radical

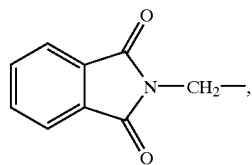

and
$R_3$ is $C_1$–$C_6$alkyl, $C_1$–$C_6$alkoxy, phenoxy or halogen,
the ring A may be further substituted by —$SO_3^-M^+$, wherein $M^+$ is a cation, and the rings B and C may be unsubstituted or further mono- or poly-substituted by halogen, hydroxy, —SH, amino, $C_1$–$C_6$alkylamino, $C_1$–$C_6$alkyl, $C_1$–$C_6$alkoxy, phenoxy, acylamino, $C_1$–$C_6$thioalkyl or by thiophenyl, and the ring B may be substituted in the 5- or 8-position by a radical of formula

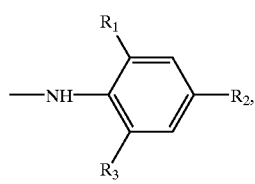

(2)

wherein $R_1$, $R_2$ and $R_3$ are as defined above.

$R_1$, $R_2$ and $R_3$ as $C_1$–$C_6$alkyl are, for example, methyl, ethyl, propyl, isopropyl, n-butyl, iso-butyl, sec-butyl, tert-butyl, amyl, tert-amyl (1,1-dimethylpropyl), 1,1,3,3-tetramethylbutyl, hexyl, 1-methylpentyl, neopentyl, cyclopentyl, cyclohexyl, as well as the associated isomers.

$R_1$, $R_2$ and $R_3$ as $C_1$–$C_4$alkoxy are, for example, methoxy, ethoxy, propoxy or butoxy.

$R_1$, $R_2$ and $R_3$ as halogen are, for example, chlorine, bromine or iodine, and preferably chlorine.

Acyl in acylamino or in the formula —$CH_2NH$acyl is preferably formyl, acetyl, chloroacetyl, acryl or propionyl.

$C_1$–$C_6$Thioalkyl as a substituent of ring B and/or C is, for example, methylthio, ethylthio, propylthio or butylthio.

$R_1$ is preferably ethyl or bromine, and especially methyl.

$R_2$ is preferably hydrogen, ethyl, phenoxy, and especially methyl.

$R_3$ is preferably ethyl or bromine, and especially methyl.

The cation $M^+$ is, for example, $Na^+$, $Li^+$, $K^+$, $Ca^{2+}$, $Mg^{2+}$, $Sr^{2+}$, $Al^{3+}$ or the cation of an organic amine such as, for example, ethylenediamine, diethylenetriamine, triethanolamine, tri-isopropanolamine, cyclohexylamine, hexamethylenediamine, Rosin Amine D and Primene 81R.

Preference is given to pigment colourants of formula (1) wherein the ring B is substituted by chlorine, and special preference is given to those wherein the ring B is unsubstituted or is substituted in the 5- or 8-position by a radical of formula

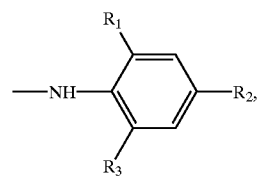

(2)

wherein $R_1$,
$R_2$ and $R_3$ have the definitions and preferred meanings mentioned above.

Also preferred are pigment colourants of formula (1) wherein the ring C is unsubstituted or is substituted by bromine.

Special preference is given to the pigment colourants of formula (1) wherein the ring B is unsubstituted or is substituted in the 5- or 8-position by a radical of formula

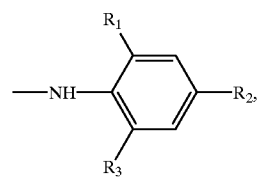

(2)

wherein $R_1$, $R_2$ and $R_3$ are methyl, and the ring C is unsubstituted.

Very special preference is given to pigment colourants of formula (1) wherein the ring B is unsubstituted or is substituted in the 5-position by a radical of formula

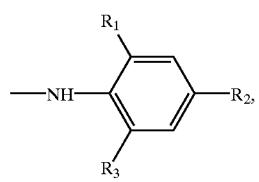

(2)

wherein $R_1$, $R_2$ and $R_3$ are methyl, and the ring C is unsubstituted.

The pigment colourants of formula (1) according to the invention are prepared, for example, by reacting 1-chloro-, 1-nitro- or 1-sulfo-anthraquinone with one equivalent of a compound of formula

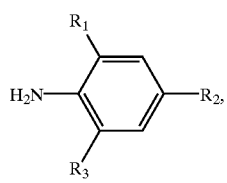

(2a)

wherein $R_1$, $R_2$ and $R_3$ are as defined for formula (1), in the presence of alkali acetate, copper and/or a copper salt and optionally in an organic solvent, or by reacting 1,5- or 1,8-dichloro-, 1,5- or 1,8-dinitro- or 1,5- or 1,8-disulfoanthraquinone with two equivalents of a compound of formula (2a) in the presence of alkali acetate, copper and/or a copper salt and optionally in an organic solvent, and, where appropriate, introducing further substituents into the resulting compound according to conventional methods.

The compounds of formula (2a) are known or can be prepared according to known methods.

The present invention relates also to a method of preparing coloured plastics or polymeric coloured particles, which method comprises mixing together a high molecular weight organic material and at least one pigment colourant of formula (1) in an amount having a colouring effect.

Colouring of high molecular weight organic substances with the pigment colourant of formula (1) is carried out, for example, by mixing such a pigment colourant with the substrates using rolling mills, mixing or grinding apparatuses, as a result of which the pigment colourant is dissolved or finely divided in the high molecular weight material. The high molecular weight material with the admixed pigment colourant is subsequently processed by methods known per se, for example calendering, compression moulding, extrusion, coating, spinning, casting or by injection moulding, whereby the coloured material acquires its final form. The admixture of the pigment colourant may also be carried out immediately prior to the actual processing step, for example by continuously feeding a solid pigment colourant, for example a pulverulent pigment colourant, and, at the same time, a granulated or powdered high molecular weight organic material, and optionally also additional ingredients, for example additives, directly into the intake zone of an extruder, where mixing takes place immediately before processing. In general, however, it is preferred to mix the pigment colourant with the high molecular weight organic material beforehand, since more uniformly coloured substrates can be obtained.

In order to produce mouldings that are not rigid or to reduce their brittleness, it is often desirable to incorporate so-called plasticisers into the high molecular weight compounds prior to shaping. There may be used as plasticisers, for example, esters of phosphoric acid, phthalic acid or sebacic acid. In the method according to the invention, the plasticisers may be incorporated into the polymers before or after the. incorporation of the colourant. It is also possible, in order to achieve different colour shades, to add to the high molecular weight organic substances, in addition to the pigment colourant of formula (1), also further pigments or other colourants in any desired amounts, optionally together with further additional ingredients, for example fillers or siccatives.

Preference is given to the colouring of thermoplastic plastics especially in the form of fibres. Preferred high molecular weight organic materials that can be coloured according to the invention are, very generally, polymers having a dielectric constant $\geq 2.5$, especially polyester, polycarbonate (PC), polystyrene (PS), polymethyl methacrylate (PMMA), polyamide, polyethylene, polypropylene, styrene/acrylonitrile (SAN) or acrylonitrilelbutadiene/styrene (ABS). Special preference is given to polyester and polyamide. Very special preference is given to linear aromatic polyesters, which can be obtained by polycondensation of terephthalic acid and glycols, especially ethylene glycol, or condensation products of terephthalic acid and 1,4-bis(hydroxymethyl)cyclohexane, for example polyethylene terephthalate (PET) or polybutylene terephthalate (PBTP); also polycarbonates, for example those of α,α-dimethyl4,4-dihydroxy-diphenylmethane and phosgene, or polymers based on polyvinyl chloride and on polyamide, for example polyamide 6 or polyamide 6.6.

The pigment colourants according to the invention impart to the above-mentioned materials, especially to the polyester and polyamide materials, tinctorially strong, level colour shades which have very good fastness properties in use, especially good fastness to light and good thermostability.

The Examples which follow serve to illustrate the invention. In the Examples, unless indicated to the contrary, parts are parts by weight and percentages are percentages by weight.

Temperatures are given in degrees Celsius. The relationship between parts by weight and parts by volume is the same as that between grams and cubic centimetres.

EXAMPLE 1

12.1 parts by weight of 1-chloroanthraquinone are stirred together with 13.5 parts by weight of mesidine, 5.0 parts by weight of potassium acetate, 0.1 part by weight of copper and 0.1 part by weight of copper(I) chloride in 60.0 parts by weight of 1-pentanol for 6 hours at 130° C. The reaction mixture is cooled and the precipitated product is filtered off with suction and washed with a small amount of 1-pentanol, yielding 13.0 parts by weight of the colourant of formula

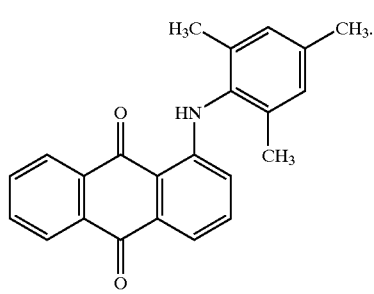

(3)

The colourant mass-colours polyester and polyamide in brilliant, lightfast red shades.

If in Example 1 the 13.5 parts by weight of mesidine are replaced by equivalent amounts of an amine indicated in column 3 of Table 1 and/or if the 12.1 parts by weight of 1-chloro-anthraquinone are replaced by equivalent amounts of an anthraquinone derivative indicated in column 2 of Table 1, colourants having good properties are likewise obtained.
TABLE 1
| Ex. | Anthraquinone derivative | Amine | Colourant | Shade on PES/PA |
|---|---|---|---|---|
| 2 | 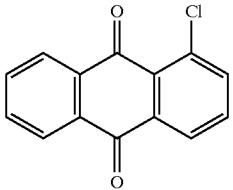 | 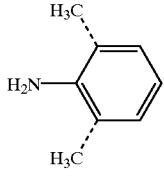 | 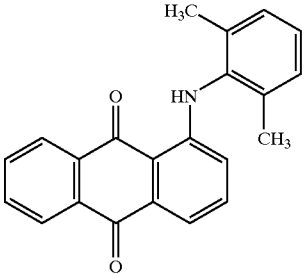 | yellowish red |
| 3 | 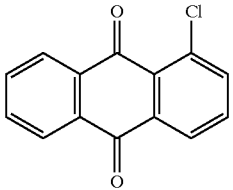 | 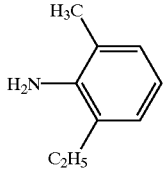 | 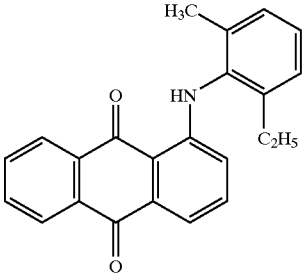 | yellowish red |
| 4 | 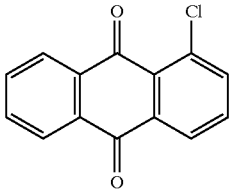 | 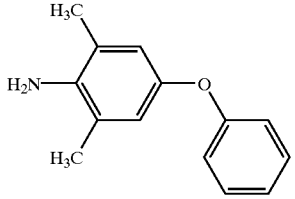 | 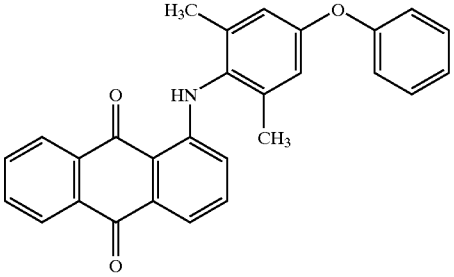 | yellowish red |
| 5 | 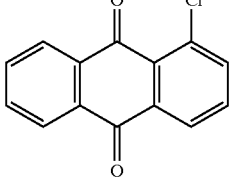 | 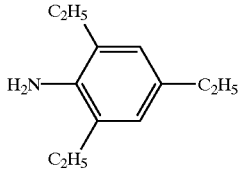 | 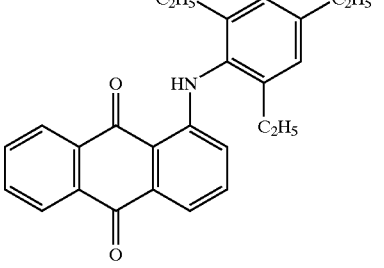 | yellowish red |
| 6 | 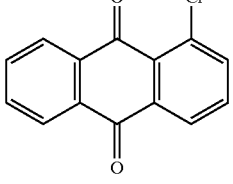 | 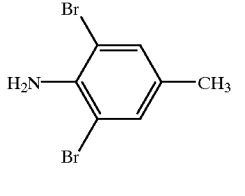 | 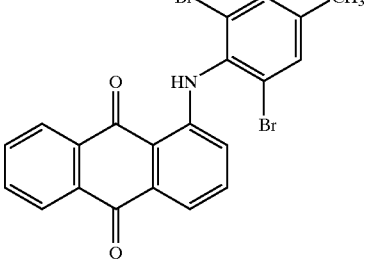 | yellowish red |

TABLE 1-continued
| Ex. | Anthraquinone derivative | Amine | Colourant | Shade on PES/PA |
|---|---|---|---|---|
| 7 | 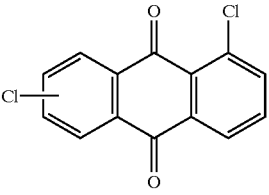 | 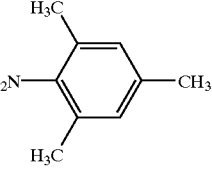 | 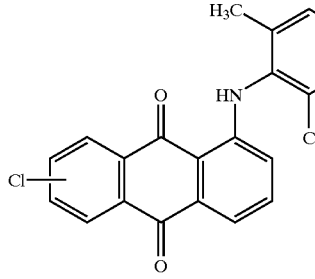 | yellowish red |
| 8 | 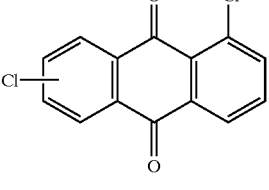 | 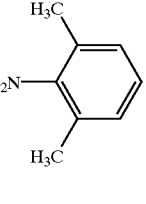 | 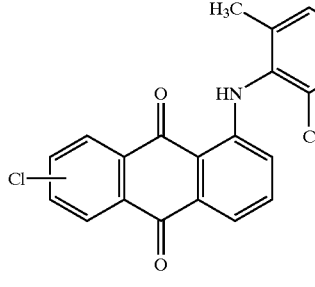 | yellowish red |
| 9 | 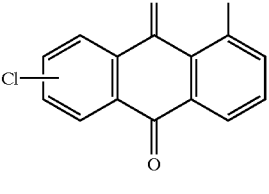 | 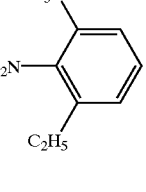 | 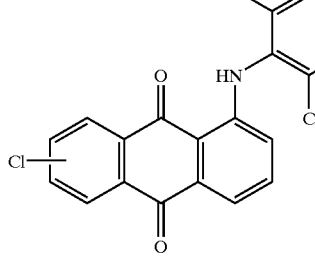 | yellowish red |
| 10 | 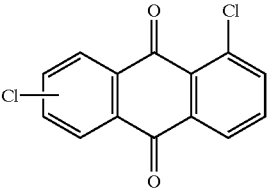 | 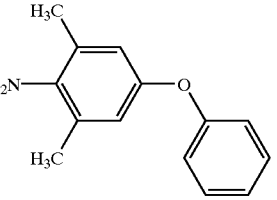 | 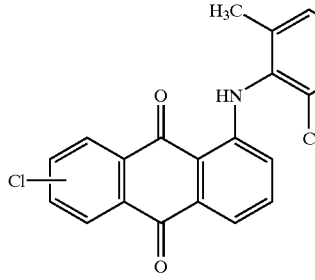 | yellowish red |
| 11 | 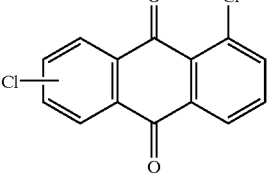 | 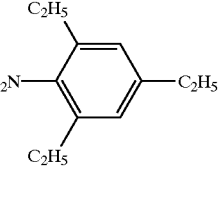 | 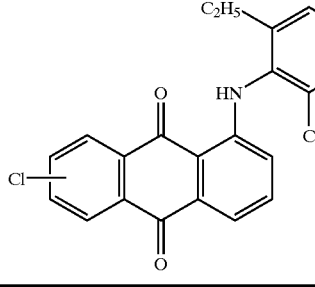 | yellowish red |

EXAMPLE 12

12.1 parts by weight of 1-chloroanthraquinone are stirred together with 12.0 parts by weight of 2,4-xylidine, 5.0 parts by weight of potassium acetate, 0.1 part by weight of copper and 0.1 part by weight of copper(I) chloride in 60.0 parts by weight of 1-pentanol for 6 hours at 130° C. The reaction mixture is cooled and the precipitated product is filtered off with suction and washed with a small amount of 1-pentanol, yielding 13.5 parts by weight of the corn pound of formula

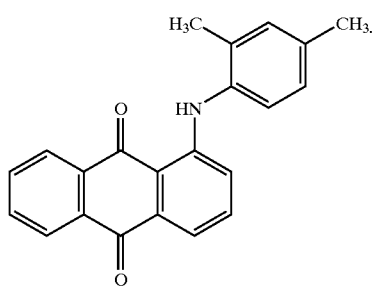
(4)

4.5 parts by weight of bromine are added to 8.2 parts by weight of the compound of formula (4) in 100.0 parts by weight of chlorobenzene at 35° C. Stirring is carried out for 12 hours at 35° C., the reaction product is filtered off with suction, and the residue is washed with a small amount of chlorobenzene, yielding 10.0 parts by weight of the colourant of formula

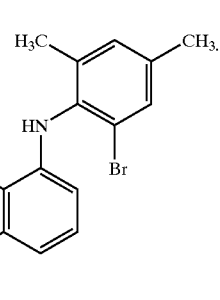
(5)

The colourant mass-colours polyester and polyamide in brilliant, lighffast red shades.

The products listed in Table 2 are prepared analogously to Example 12.

TABLE 2

| Ex. | Anthraquinone derivative | Amine | Colourant | Shade on PES/PA |
|---|---|---|---|---|
| 13 | | | | yellowish red |
| 14 | | | | yellowish red |
| 15 | | | | yellowish red |

EXAMPLE 16

12.1 parts by weight of 1-chloroanthraquinone are stirred together with 10.7 parts by weight of p-toluidine, 5.0 parts by weight of potassium acetate, 0.1 part by weight of copper and 0.1 part by weight of copper(I) chloride in 60.0 parts by weight of 1-pentanol for 6 hours at 130° C. The reaction mixture is cooled and the precipitated product is filtered off with suction and washed with a small amount of 1-pentanol, yielding 12.0 parts by weight of the compound of formula

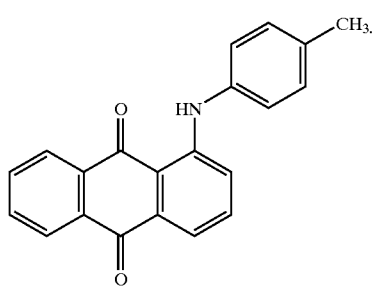

(6)

13.0 parts by weight of bromine are added to 7.8 parts by weight of the compound of formula (6) in 100.0 parts by weight of chlorobenzene at 35° C. Stirring is carried out for 12 hours at 35° C., the reaction product is filtered off with suction, and the residue is washed with a small amount of chlorobenzene, yielding 13.0 parts by weight of the colourant of formula

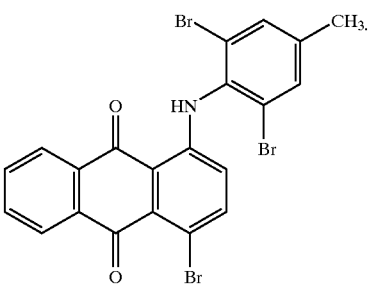

(7)

The colourant mass-colours polyester and polyamide in brilliant, lightfast red shades.

The products listed in Table 3 can be obtained analogously to Example 16.

TABLE 3

| Ex. | Anthraquinone derivative | Amine | Colourant | Shade on PES/PA |
|---|---|---|---|---|
| 17 | ![1-chloroanthraquinone] | o-toluidine | bromo-anthraquinone-toluidine | yellowish red |
| 18 | ![1-chloroanthraquinone] | 2,4-dimethylaniline | dibromo-anthraquinone-xylidine | yellowish red |
| 19 | ![dichloroanthraquinone] | 2,4-dimethylaniline | chloro-dibromo-anthraquinone-xylidine | yellowish red |

TABLE 3-continued

| Ex. | Anthraquinone derivative | Amine | Colourant | Shade on PES/PA |
|---|---|---|---|---|
| 20 | 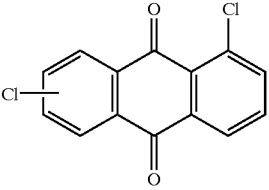 |  | 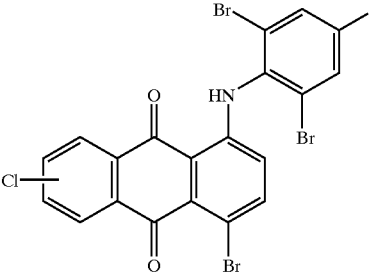 | yellowish red |
| 21 | 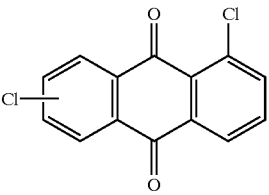 | 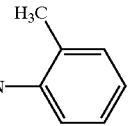 | 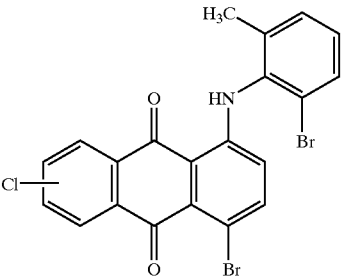 | yellowish red |

EXAMPLE 22

13.9 parts by weight of 1,5-dichloroanthraquinone are stirred together with 21.0 parts by weight of mesidine, 10.0 parts by weight of potassium acetate, 0.2 part by weight of copper and 0.2 part by weight of copper(1) chloride in 100.0 parts by weight of o-dichlorobenzene for 6 hours at 170° C. The reaction mixture is cooled and the precipitated product is filtered off with suction and washed with a small amount of odichlorobenzene, yielding 19.0 parts by weight of the colourant of formula

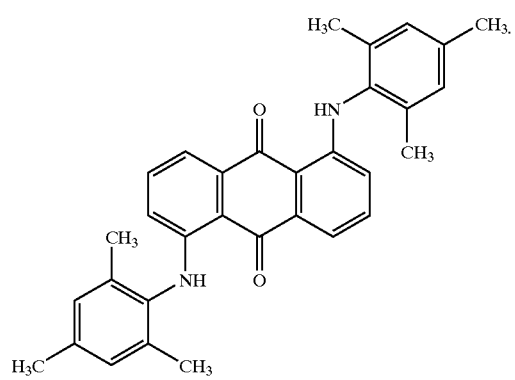

(8)

The colourant mass-colours polyester and polyamide in brilliant, lightfast red shades.

If in Example 22 the 21.0 parts by weight of mesidine are replaced by equivalent amounts of an amine indicated in column 3 of Table 4 and/or if the 13.9 parts by weight of 1,5-dichloro-anthraquinone are replaced by equivalent amounts of an anthraquinone derivative indicated in column 2 of Table 4, colourants having good properties are likewise obtained.

TABLE 4
| Ex. | Anthraquinone derivative | Amine | Colourant | Shade on PES/PA |
|---|---|---|---|---|
| 23 | 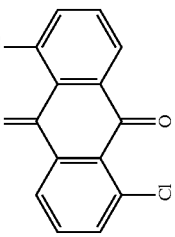 | 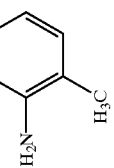 | 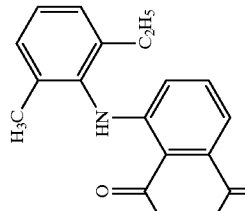 | red |
| 24 | 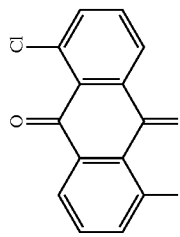 | 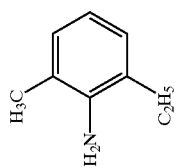 | 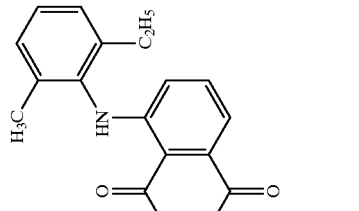 | red |

TABLE 4-continued
| Ex. | Anthraquinone derivative | Amine | Colourant | Shade on PES/PA |
|---|---|---|---|---|
| 25 | 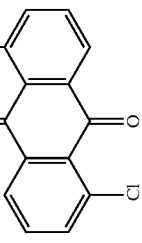 | 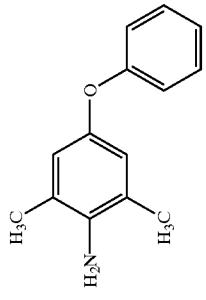 | 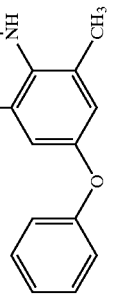 | red |
| 26 | 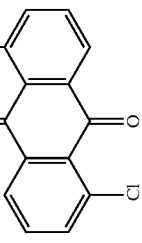 | 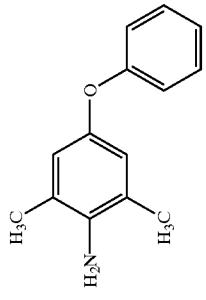 | 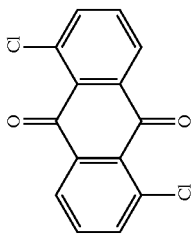 | red |

TABLE 4-continued
| Ex. | Anthraquinone derivative | Amine | Colourant | Shade on PES/PA |
|---|---|---|---|---|
| 27 | 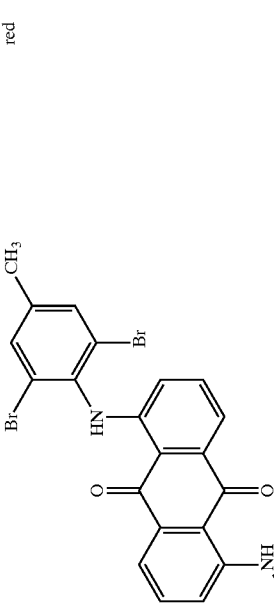 | 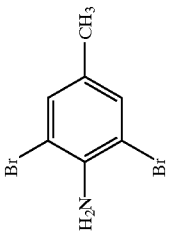 | 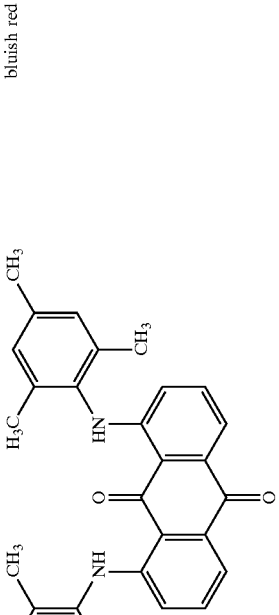 | red |
| 28 | 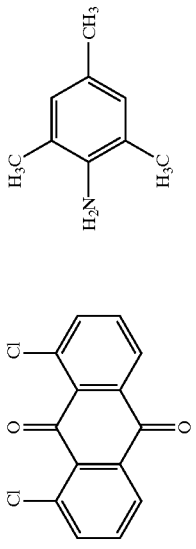 | 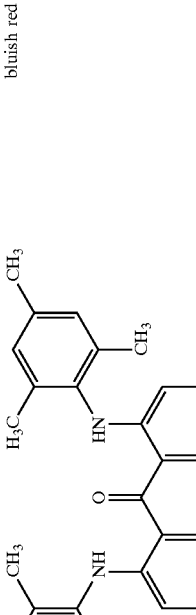 | 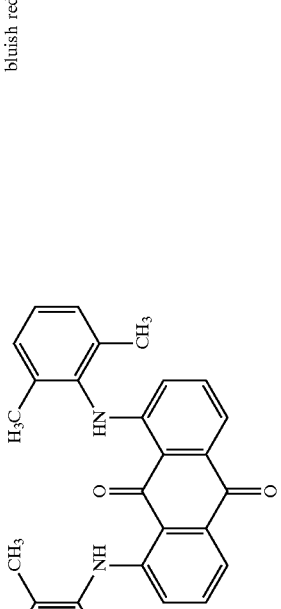 | bluish red |
| 30 | 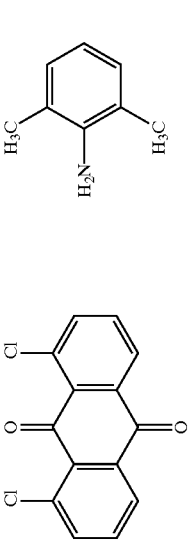 | 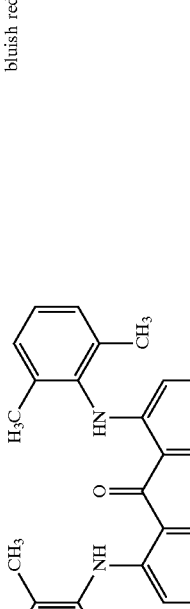 |  | bluish red |

TABLE 4-continued
| Ex. | Anthraquinone derivative | Amine | Colourant | Shade on PES/PA |
|---|---|---|---|---|
| 31 | 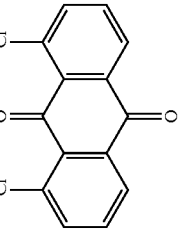 | 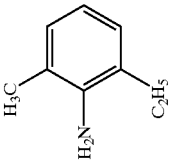 | 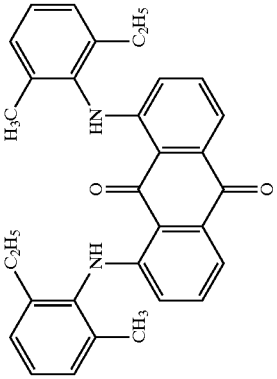 | bluish red |
| 32 | 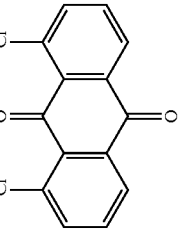 | 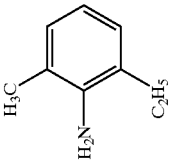 | 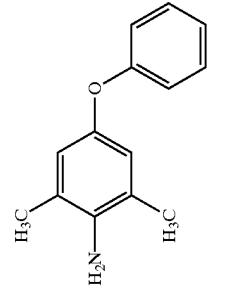 | bluish red |
| 33 | 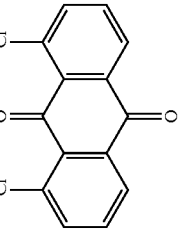 | 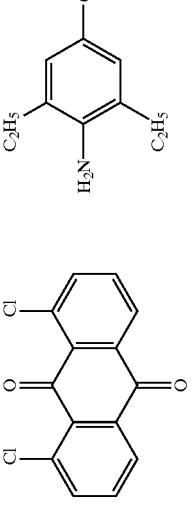 | | bluish red |

EXAMPLE 34

17.0 parts by weight of the compound according to Example 1 are dissolved in portions at 5–10° C. in 100% sulfuric acid. 7.0 parts by weight of N-hydroxymethylchloroacetamide are then added at 5–10° C. Stirring is carried out for 12 hours at 5–10° C., and the reaction mixture is poured onto ice. The precipitate is filtered off with suction, washed neutral with water and dried, yielding 23.0 parts by weight of the colourant of formula

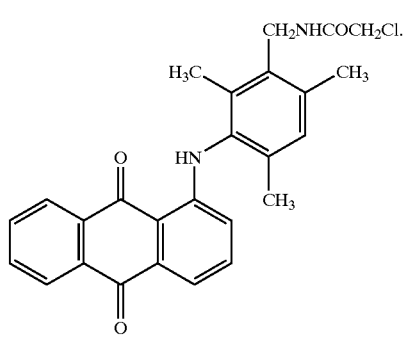

(9)

The colourant mass-colours polyester and polyamide in brilliant, lightfast red shades.

EXAMPLE 35

If in Example 34 the 7.0 parts by weight of N-hydroxymethylchloroacetamide are replaced by 14.0 parts by weight of N-hydroxymethylchloroacetamide, 29.0 parts by weight of the colourant of formula

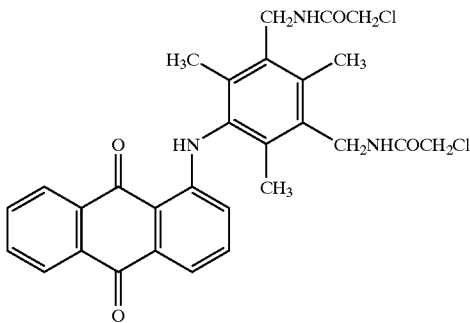

(10)

are obtained. The colourant mass-colours polyester and polyamide in brilliant, lightfast red shades.

EXAMPLE 36

If in Example 35 the 17.0 parts by weight of the compound according to Example 1 are replaced by 23.7 parts by weight of the compound according to Example 22, 35.0 parts by weight of the colourant of formula

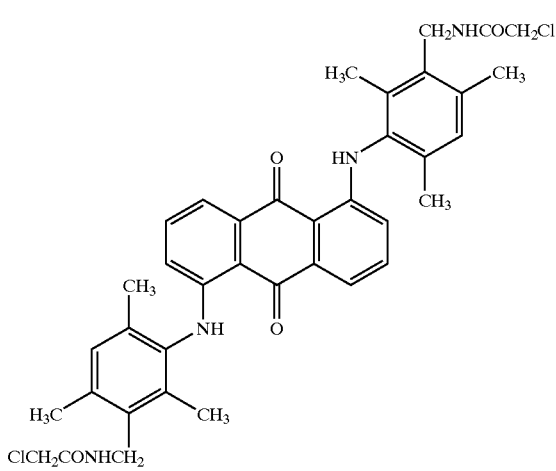

(11)

are obtained. The colourant mass-colours polyester and polyamide in brilliant, lighffast red shades.

The colourants listed in Table 5 are obtained analogously to Example 36.

TABLE 5

| Ex. | Anthraquinone derivative | Amine | Colourant | Shade on PES/PA |
|---|---|---|---|---|
| 37 | (1-(2,4,6-trimethylanilino)anthraquinone) | HOCH₂NHCOC₆H₅ | anthraquinone with −CH₂NHCOC₆H₅ substituent | yellowish red |
| 38 | (1-(2,4,6-trimethylanilino)anthraquinone) | HOCH₂NHCOCH=CH₂ | anthraquinone with −CH₂NHCOCH=CH₂ substituent | yellowish red |
| 39 | (1-(2,4,6-trimethylanilino)anthraquinone) | HOCH₂-phthalimide | anthraquinone with −CH₂-phthalimide substituent | yellowish red |

TABLE 5-continued
| Ex. | Anthraquinone derivative | Amine | Colourant | Shade on PES/PA |
|---|---|---|---|---|
| 40 | 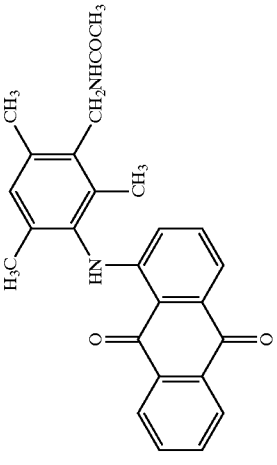 | 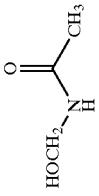 | 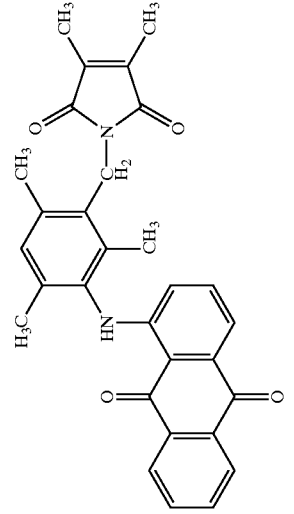 | yellowish red |
| 41 | 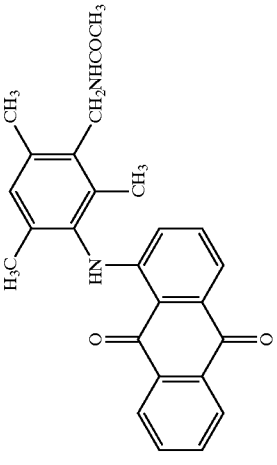 | 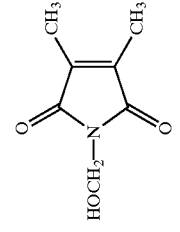 | 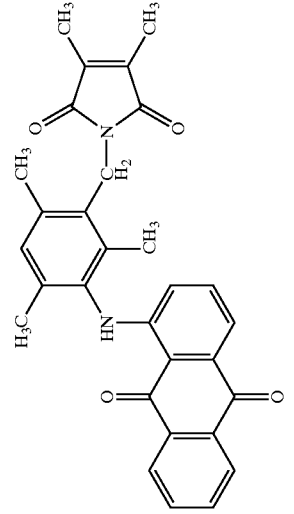 | yellowish red |
| 42 | 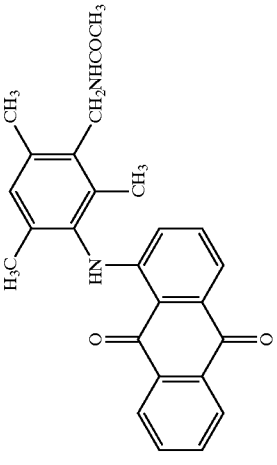 | 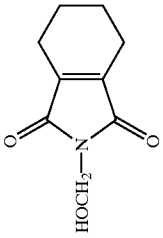 | 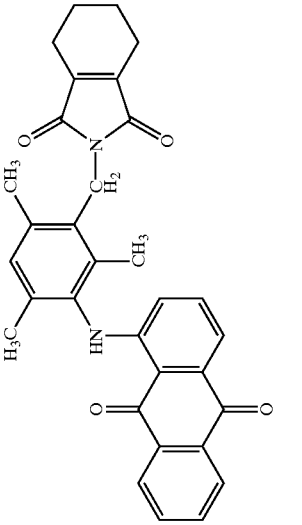 | yellowish red |

TABLE 5-continued

| Ex. | Anthraquinone derivative | Amine | Colourant | Shade on PES/PA |
|---|---|---|---|---|
| 43 | 1-(2,4,6-trimethylphenylamino)anthraquinone | 2-hydroxy-2-(acrylamido)acetic acid (CO₂H, OH, NHCOCH=CH₂) | anthraquinone with NH-(2,4,6-trimethylphenyl) bearing –CH(CO₂H)(NHCOCH=CH₂) substituent | yellowish red |
| 44 | 1,5-bis(2,4,6-trimethylphenylamino)anthraquinone | N-(hydroxymethyl)chloroacetamide (HOCH₂NHCOCH₂Cl) | 1,5-bis[(2,4,6-trimethyl-3-(CH₂NHCOCH₂Cl)phenyl)amino]anthraquinone | red |
| 45 | 1,5-bis(2,4,6-trimethylphenylamino)anthraquinone | N-(hydroxymethyl)chloroacetamide (HOCH₂NHCOCH₂Cl) | 1,5-bis[(2,4,6-trimethylphenyl with CH₂NHCOCH₂Cl)amino]anthraquinone | bluish red |

EXAMPLE 46

19.9 parts by weight of sodium thiophenolate are dissolved in 225.0 parts by weight of dimethylformamide (DMF) at 25° C.; 25.7 parts by weight of 1-amino-4-chloroanthraquinone are added thereto in portions. The mixture is stirred for 20 hours at 25° C. and diluted with water. The resulting reaction product is filtered off with suction, washed with a small amount of methanol and dried, yielding 30.0 parts by weight of the compound of formula

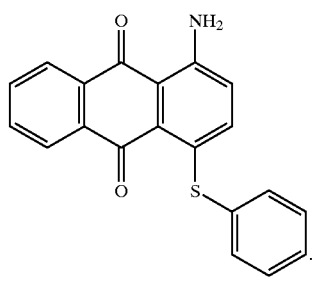

(12)

16.5 parts by weight of the compound of formula (12) are boiled at reflux for 4 hours with 11.0 parts by weight of bromomesitylene, 2.5 parts by weight of sodium carbonate, 0.1 part by weight of copper and 0.1 part by weight of copper(I) chloride in 50.0 parts by weight of nitrobenzene. The reaction mixture is cooled and the nitrobenzene is distilled off with water vapour. The precipitated product is filtered off with suction and dried, yielding 24.0 parts by weight of the colourant of formula

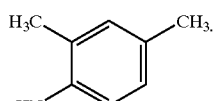

(13)

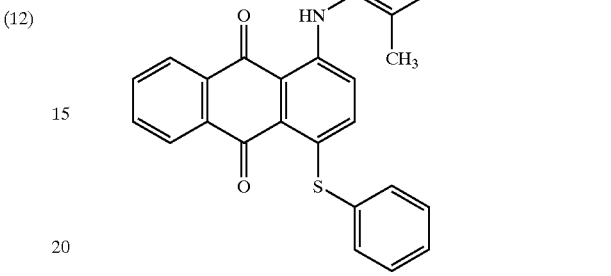

The colourant mass-colours polyester and polyamide in lighffast, reddish blue shades.

The colourants listed in Table 6 are obtained analogously to Example 46.

TABLE 6

| Ex. | Anthraquinone derivative | | Colourant | Shade on PES/PA |
|---|---|---|---|---|
| 47 | ![structure] | | ![structure] | reddish blue |
| 48 | ![structure] | 1) thiophenolate 2) mesidine | ![structure] | reddish blue |

TABLE 6-continued

| Ex. | Anthraquinone derivative | | Colourant | Shade on PES/PA |
|---|---|---|---|---|
| 49 | 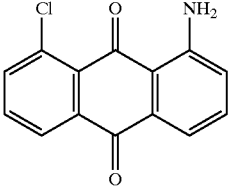 | 1) thiophenolate<br>2) mesidine | 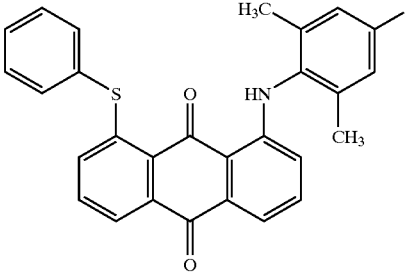 | blue |

EXAMPLE 50

4.8 parts by weight of the compound of Example 22 are dissolved in portions at 0–5° C. in 30.0 parts by weight of 5% oleum. The reaction mixture is stirred for 4 hours at 10° C. and poured into 200 parts by weight of ice. The precipitate is filtered off with suction, washed with water, made into a slurry in 100 parts by weight of water, neutralised with 1.5 parts by weight of hexamethylenediamine, and filtered off with suction again, yielding 6.6 parts by weight of the compound of formula

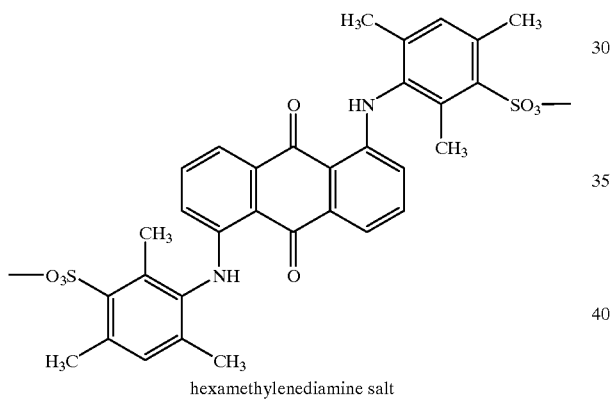
hexamethylenediamine salt

The colourant mass-colours polyamide in brilliant, light-fast red shades.

The colourants listed in Table 7 are obtained analogously to Example 50.

TABLE 7

| Ex. | Anthraquinone derivative | Colourant | Shade on PA |
|---|---|---|---|
| 51 | 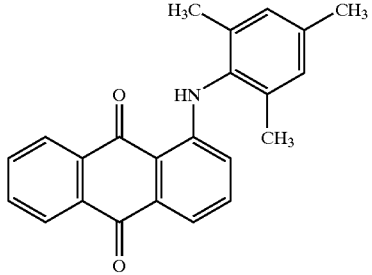 | 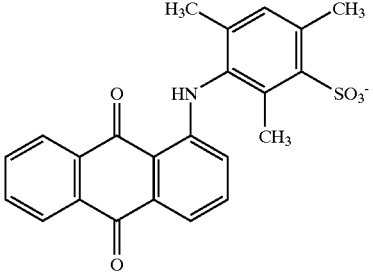<br>hexamethylenediamine salt | scarlet |

TABLE 7-continued

| Ex. | Anthraquinone derivative | Colourant | Shade on PA |
|---|---|---|---|
| 52 | 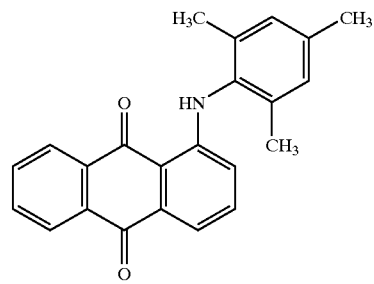 | <br>hexamethylenediamine salt | bluish red |

COLOURING EXAMPLE 1

1200.00 g of polyester granules (PET Arnite D04-300, DSM) are pre-dried for 4 hours at 130° C. and then mixed homogeneously with 0.24 g of the pigment colourant of formula

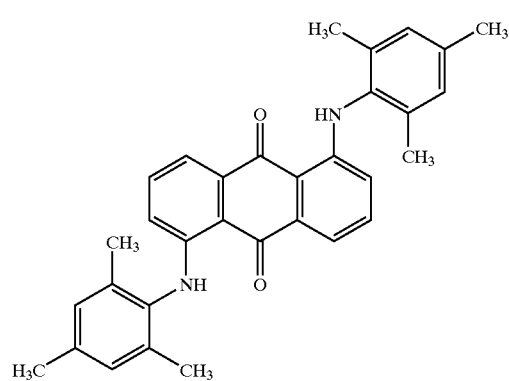

(8)

in a "Roller rack" mixing apparatus for 15 minutes at 60 revolutions per minute. The homogeneous mixture is extruded in an extruder (twin screw 25 mm from Collin, D-85560 Ebersburg) having 6 heating zones at a maximum temperature of 275° C., cooled with water, granulated in a granulator (Turb Etuve TE 25 from MAPAG AG, CH-3001 Bern), and then dried for 4 hours at 130° C.

There are obtained red-coloured polyester granules having good all-round properties, especially very good light fastness and high temperature light fastness.

COLOURING EXAMPLE 2

1200.00 g of polyamide 6 granules (Ultramid B3K, BASF) are pre-dried for 4 hours at 75° C. and then mixed homogeneously with 2.40 g of the pigment colourant of formula

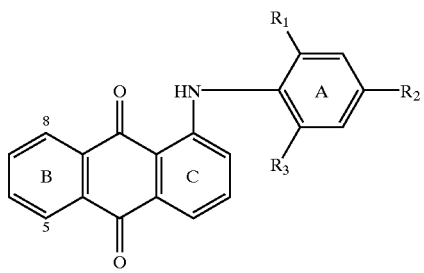

(3)

in a "Roller rack" mixing apparatus for 15 minutes at 60 revolutions per minute. The homogeneous mixture is extruded in an extruder (twin screw 25 mm from Collin, D-85560 Ebersburg) having 6 heating zones at a maximum temperature of 220° C., cooled with water, granulated in a granulator (Turb Etuve TE 25 from MAPAG AG, CH-3001 Bern), and then dried for 4 hours at 75° C.

There are obtained violet-red-coloured polyamide granules having good all-round properties, especially very good light fastness and high temperature light fastness.

What is claimed is:

1. A pigment colourant of formula (1)

wherein $R_1$ is $C_1$–$C_6$alkyl, $C_1$–$C_6$alkoxy, phenoxy or halogen, $R_2$ is hydrogen, $C_1$–$C_6$alkyl, $C_1$–$C_6$alkoxy, phenoxy, halogen, acylamino, —$CH_2$NHacyl or the radical

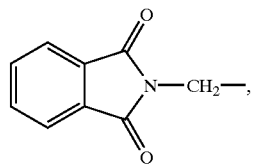

and R$_3$ is methyl, ethyl or bromine, the ring A is unsubstituted or substituted by —SO$_3^-$M$^+$, wherein M$^+$ is a cation, and the ring B is unsubstituted or mono- or poly-substituted by halogen, hydroxy, —SH, amino, C$_1$–C$_6$alkylamino, C$_1$–C$_6$alkyl, C$_1$–C$_6$alkoxy, phenoxy, C$_1$–C$_6$thioalkyl or by thiophenyl, or is optionally substituted in the 8-position by a radical of formula

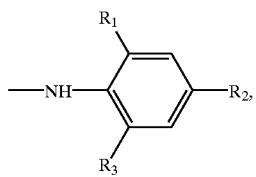

(2)

wherein R$_1$, R$_2$ and R$_3$ are as defined above, and the ring C is unsubstituted, with the proviso that R$_1$ and R$_2$ are not ethyl if R$_3$ is ethyl.

2. A pigment colourant according to claim 1 of formula

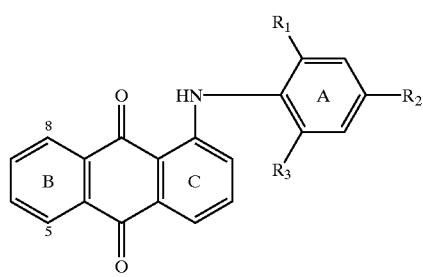

(1)

wherein R$_1$ is C$_1$–C$_6$alkyl, C$_1$–C$_6$alkoxy, phenoxy or halogen, R$_2$ is hydrogen, C$_1$–C$_6$alkyl, C$_1$–C$_6$al phenoxy, halogen, acylamino, —CH$_2$NHacyl or the radical

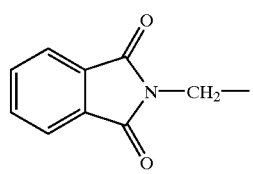

and R$_3$ is methyl, ethyl or bromine, and the ring B is unsubstituted or mono- or poly-substituted by halogen, hydroxy, —SH, amino, C$_1$–C$_6$alkylamino, C$_1$–C$_6$alkyl, C$_1$–C$_6$alkoxy, phenoxy, C$_1$–C$_6$thioalkyl or by thiophenyl, or is optionally substituted in the 8-position by a radical of formula

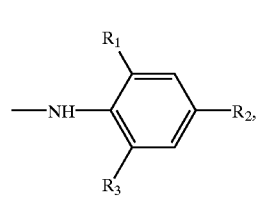

(2)

wherein R$_1$, R$_2$ and R$_3$ are as defined above.

3. A pigment colourant according to either claim 1, wherein R$_1$ is methyl, ethyl or bromine.

4. A pigment colourant according to either claim 1, wherein R$_2$ is hydrogen, methyl, ethyl or phenoxy.

5. A pigment colourant according to claim 1, wherein R$_3$ is methyl.

6. A pigment colourant according to claim 1, wherein the ring B is unsubstituted or is substituted in the 8-position by a radical of formula (2)

wherein R$_1$, R$_2$ and R$_3$ are methyl.

7. A pigment colourant according to claim 1, wherein R$_2$ is methyl.

8. A pigment colourant according to claim 1 of formula

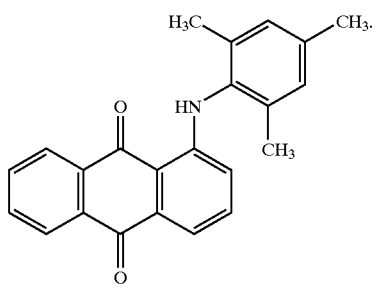

(3)

9. A pigment colourant according to claim 1 of formula

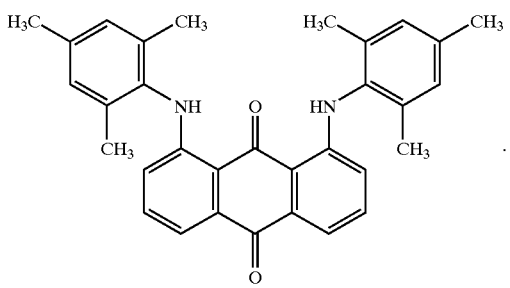

10. A process for the preparation of a pigment colourant of formula (1) according to claim 1, which process comprises reacting 1-chloro-, 1-nitro- or 1-sulfo-anthraquinone with one equivalent of a compound of formula

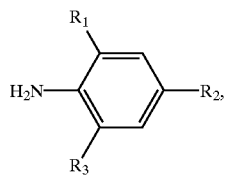

(2a)

wherein $R_1$ is $C_1$–$C_6$alkyl, $C_1$–$C_6$alkoxy, phenoxy or halogen, $R_2$ is hydrogen, $C_1$–$C_6$alkyl, $C_1$–$C_6$alkoxy, phenoxy, halogen, acylamino, —$CH_2$NHacyl or the radical

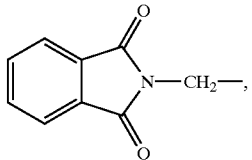

and $R_3$ is methyl, ethyl or bromine, with the proviso that $R_1$ and $R_2$ are not ethyl if $R_3$ is ethyl, in the presence of an alkali acetate and copper or an alkali acetate and a copper salt or an alkali acetate, copper and a copper salt and optionally in an organic solvent, or reacting 1,5- or 1,8-dichloro-, 1,5- or 1,8-dinitro- or 1,5- or 1,8-disulfo-anthraquinone with two equivalents of a compound of formula (2a) in the presence of an alkali acetate and copper or an alkali acetate and a copper salt or an alkali acetate, copper and a copper salt and optionally in an organic solvent, and, if the rings A and B have further substituents, subsequently introducing said further substituents into the rings.

11. A method of mass-colouring synthetic materials, which method comprises incorporating a pigment colourant of formula (1) according to claim 1 into the mass of the synthetic materials.

12. A synthetic material coloured containing a pigment colourant of formula (1) according to claim 1.

* * * * *